(12) United States Patent
Kanou

(10) Patent No.: US 7,633,008 B2
(45) Date of Patent: Dec. 15, 2009

(54) ELECTRICAL CONNECTION BOX

(75) Inventor: Tomoki Kanou, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 209 days.

(21) Appl. No.: 11/795,812

(22) PCT Filed: Mar. 2, 2006

(86) PCT No.: PCT/JP2006/004013

§ 371 (c)(1),
(2), (4) Date: Jul. 23, 2007

(87) PCT Pub. No.: WO2006/095638

PCT Pub. Date: Sep. 14, 2006

(65) Prior Publication Data

US 2008/0223597 A1 Sep. 18, 2008

(30) Foreign Application Priority Data

Mar. 8, 2005 (JP) .............................. 2005-064029
Jun. 23, 2005 (JP) .............................. 2005-183423

(51) Int. Cl.
*H02G 3/08* (2006.01)
(52) U.S. Cl. .............................. 174/50; 174/58; 174/60; 174/17 R; 220/4.02; 439/535; 248/906
(58) Field of Classification Search .................. 174/50, 174/53, 58, 60, 17 R, 59, 520, 61; 220/3.2, 220/3.3, 4.02; 439/535, 752, 76.1; 248/906
See application file for complete search history.

(56) References Cited

U.S. PATENT DOCUMENTS

| 5,586,916 | A | * | 12/1996 | Shinji et al. | .................. 439/752 |
| 6,768,054 | B2 | * | 7/2004 | Sato et al. | ...................... 174/50 |
| 7,129,410 | B2 | * | 10/2006 | Kanazawa | .................... 174/50 |
| 7,179,990 | B2 | * | 2/2007 | Kanazawa | .................... 174/50 |
| 2004/0001319 | A1 | | 1/2004 | Kawakita et al. | |

FOREIGN PATENT DOCUMENTS

| JP | U-64-30625 | 2/1989 |
| JP | A-09-204952 | 8/1997 |
| JP | A-10-035375 | 2/1998 |
| JP | A-2000-217227 | 8/2000 |
| JP | A-2003-318568 | 11/2003 |
| JP | A-2004-040873 | 2/2004 |
| JP | A-2004-248426 | 9/2004 |
| JP | A-2004-248427 | 9/2004 |
| JP | A-2004-328842 | 11/2004 |

* cited by examiner

*Primary Examiner*—Dhiru R Patel
(74) *Attorney, Agent, or Firm*—Oliff & Berridge, PLC

(57) ABSTRACT

The present invention includes an electrical connection box having a circuit casing for accommodating a circuit structure therein, a housing portion disposed on a lower surface side of the circuit casing and connectable to an external connector, and a plurality of connector terminals for electrically connecting between the circuit structure and the housing portion, further each of the plurality of connector terminals is disposed along a cabling path horizontally traversing an inside of the circuit casing and leads into the housing portion through a ceiling portion of the housing portion, the electrical connection box also includes a waterproof portion provided in the circuit casing for covering the ceiling portion from above.

25 Claims, 8 Drawing Sheets

ELECTRICAL CONNECTION BOX

TECHNICAL FIELD

The present invention relates to an electrical connection box.

BACKGROUND ART

An electrical connection box installed on a vehicle or the like, as described in Patent Document 1, is known. The electrical connection box includes a circuit board, to which a bus bar is bonded, and a casing for housing the circuit board. A fuse attachment portion, into which fuse elements are fitted, is formed on the upper end of the casing. A plurality of fuse-connecting terminals, formed on the upper edge of the bus bar, project upward into the fuse attachment portion. Further, a hood portion having the open bottom is formed on the lower end of the casing. A plurality of signal terminals, formed on the lower edge of the bus bar, project downward into the hood portion. Each signal terminal is bent substantially into a L-shape so as to extend along the circuit board and next to the upper surface of the hood portion (i.e., the internal bottom of the casing) and penetrate down into the hood portion.

Patent Document 1: JP-A-2004-40873

In the above construction, when water intrudes through the fuse attachment portion or the like on the upper end of the casing into the casing due to rain, vehicle wash or the like, the water may flow down along the inner circumference of the casing or the like and then accumulate on the upper surface of the hood portion. This could result in short-circuiting among the signal terminals disposed on the upper surface of the hood portion. Because this case includes signal terminals often arranged at as short intervals (possibly due to space limitations and the like) it is particularly prone to the above problem.

The present invention was made in view of the forgoing circumstances, and an object thereof is to prevent connector terminals disposed in the lower part within the casing from short-circuiting due to water.

SUMMARY OF THE PRESENT INVENTION

An electrical connection box according to the present invention can include a circuit casing for accommodating a circuit structure therein, a housing portion disposed on the lower surface side of the circuit casing and connectable to an external connector, and a plurality of connector terminals for electrically connecting between the circuit structure and the housing portion wherein each of the plurality of connector terminals is disposed along a cabling path horizontally traversing the inside of the circuit casing and leads into the housing portion through a ceiling portion of the housing portion, and further includes a waterproof portion provided in the circuit casing for covering the ceiling portion from above.

In the electrical connection box according to the present invention, a terminal contact portion, abutting from below to a horizontal portion of the connector terminal that horizontally traverses in the circuit casing, may be provided in the circuit casing, and the waterproof portion may cover, from above, an area of the connector terminal corresponding to the terminal contact portion. According to this construction, water is prevented from accumulating on the terminal contact portion and thereby short-circuiting among the connector terminals can be prevented.

In the electrical connection box according to the present invention, a displacement restriction portion, abutting from the opposite side of the housing portion to the horizontal portion of the connector terminal that horizontally traverses in the circuit casing, may be provided in the circuit casing for restricting angular displacement of the horizontal portion, and the waterproof portion may be provided on the displacement restriction portion. According to this construction, deformation of and short-circuiting among the connector terminals can be prevented using a single member.

In the electrical connection box according to the present invention, the waterproof portion may be formed over the entire width of the array of the plurality of conencter terminals in the direction along the array. According to this construction, water running over the outer edge of the waterproof portion is guided outside of the area that includes the connector terminals. Thereby short-circuiting among the connector terminals is can be prevented.

In the electrical connection box according to the present invention, the waterproof portion may include a waterproof sidewall portion for covering the side of an outermost connector terminal out of the plurality of connector terminals. There is the possibility that the water flowing from the end edge of the waterproof portion may splash to the internal side of the end edge and reach the connector terminals, if the electrical connection box is vibrated, for example. However, according to the construction of the present invention, the water flowing down can be prevented from reaching the connector terminals, since the waterproof sidewall portion covers the side of the outermost connector terminal.

In the electrical connection box according to the present invention, the waterproof sidewall portion may extend to the outer wall portion of the housing portion. According to this construction, the waterproof property can be further improved, since the waterproof portion and the outer wall portion of the housing portion surround the connector terminals.

In the electrical connection box according to the present invention, a tapered surface, descending from the middle of the array of the connector terminals toward either side thereof, may be formed on the upper surface of the waterproof portion. According to this construction, the water on the waterproof portion is guided along the slopes of the tapered surface to the outside of the area that includes the connector terminals, and thereafter drains. Thus the water accumulated on the waterproof portion is drained while short-circuiting among the connector terminals is prevented.

In the electrical connection box according to the present invention, a surface of the circuit structure may be covered with a waterproof sealing material, and the end edge of the circuit structure side of the waterproof portion may be buried into the waterproof sealing material. According to this construction, no clearance for enabling passage of water is formed between the waterproof portion and the surface of the waterproof sealing material, and therefore the water is certainly kept away from the proximal side (i.e., circuit structure connecting side) of the connector terminals.

In the electrical connection box according to the present inventions the end edge of the waterproof portion on the opposite side of the end edge on the circuit structure side may be immediately above the end edge of the horizontal portion on the opposite side of the circuit structure side. According to this construction, the bared part of the horizontal portion, which protrudes from the waterproof sealing material, is entirely covered with the waterproof portion, and thereby the water is further can be kept away from the connector terminals.

An electrical connection box according to the present invention may be constructed so that the circuit casing accommodates the circuit structure vertically, in which a surface of the circuit structure is covered with a waterproof sealing material and a drain outlet connecting with the surface of the waterproof sealing material is provided on the lower portion of the circuit casing for connecting between the internal space of the circuit casing and the external space. Further the end edge portion of the waterproof portion may be close to the surface of the waterproof sealing material while holding a clearance therebetween for enabling passage of water. According to this construction, the water flows via the waterproof portion and then along the surface of the waterproof sealing material, so as to drain via the drain outlet. Thereby the water can be prevented from accumulating on the ceiling portion, and consequently short-circuiting among the connector terminals is certainly prevented.

In the electrical connection box according to the present invention, the upper surface of the waterproof portion may form an inclined surface descending toward the waterproof sealing material side. According to this construction, the drainage property is further improved, since the water is guided along the inclined surface to the surface of the waterproof sealing material so as to reach the drain outlet.

In the electrical connection box according to the present invention, a guide piece on the inner circumference of the circuit casing may be provided above the waterproof portion, in which the guide piece inwardly protrudes so that its protruding end is immediately above the waterproof portion. According to this construction, water flowing along the inner circumference of the circuit casing is can be guided to the waterproof portion via the guide piece, and thereby the water is prevented from reaching the connector terminals.

In the electrical connection box according to the present invention, a water stop portion may be provided on the edge portion of the waterproof portion on the guide piece side, in which the water stop portion protrudes toward the guide piece side and is immediately below the protruding end of the guide piece. According to this construction, the water having transferred from the guide piece to the waterproof portion is prevented from dropping down from the edge portion of the waterproof portion on the guide piece side, and thereby the water is further can be kept away from the connector terminals.

In the electrical connection box according to the present invention, a bus bar for the circuit structure may be provided, and the connecter terminals may be on-bus bar terminals integrated with the bus bar. The effects of the present invention can be also obtained in this case.

According to the construction of the present invention, water having intruded into the circuit casing drops onto the waterproof portion and thereby is prevented from reaching the ceiling portion of the housing portion disposed below. Thus the water is prevented from accumulating on the ceiling portion, and consequently short-circuiting among the connecter terminals disposed on the ceiling portion is prevented.

EXPLANATION OF SYMBOLS

Figure 1:
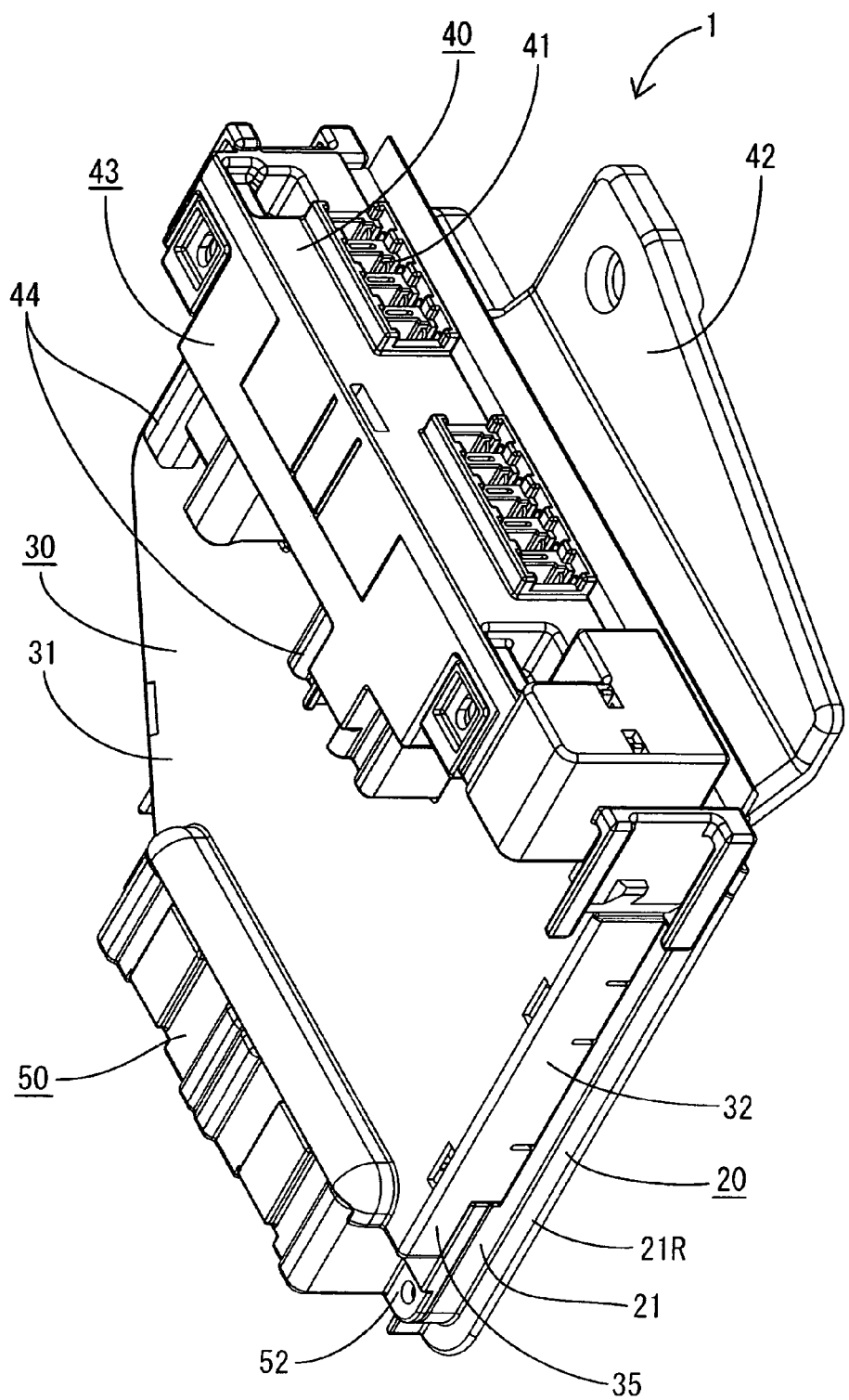
FIG. 1 is an appearance perspective view of an electrical connection box according to a first embodiment.

1: Electrical connection box
10: Circuit structure
12: Bus bar
15: Lower on-bus-bar terminal (Connector terminal)
15A: Raised portion (Horizontal portion)
20: Casing (Circuit casing)
26: Potting material (Waterproof sealing material)
30: Cover (Circuit casing)
50: Lower connector housing (Housing portion)
54: Ceiling portion
56: Terminal contact portion
60: Displacement restriction portion
61: Waterproof wall (Waterproof portion)
62: Water stop wall (Water stop portion)
63: Tapered surface
64: Waterproof sidewall portion
65: Guide piece

BEST MODE FOR CARRYING OUT THE INVENTION

First Embodiment

A first embodiment according to the present invention will be hereinafter explained with reference to FIGS. 1 through 5.

Figure 2:
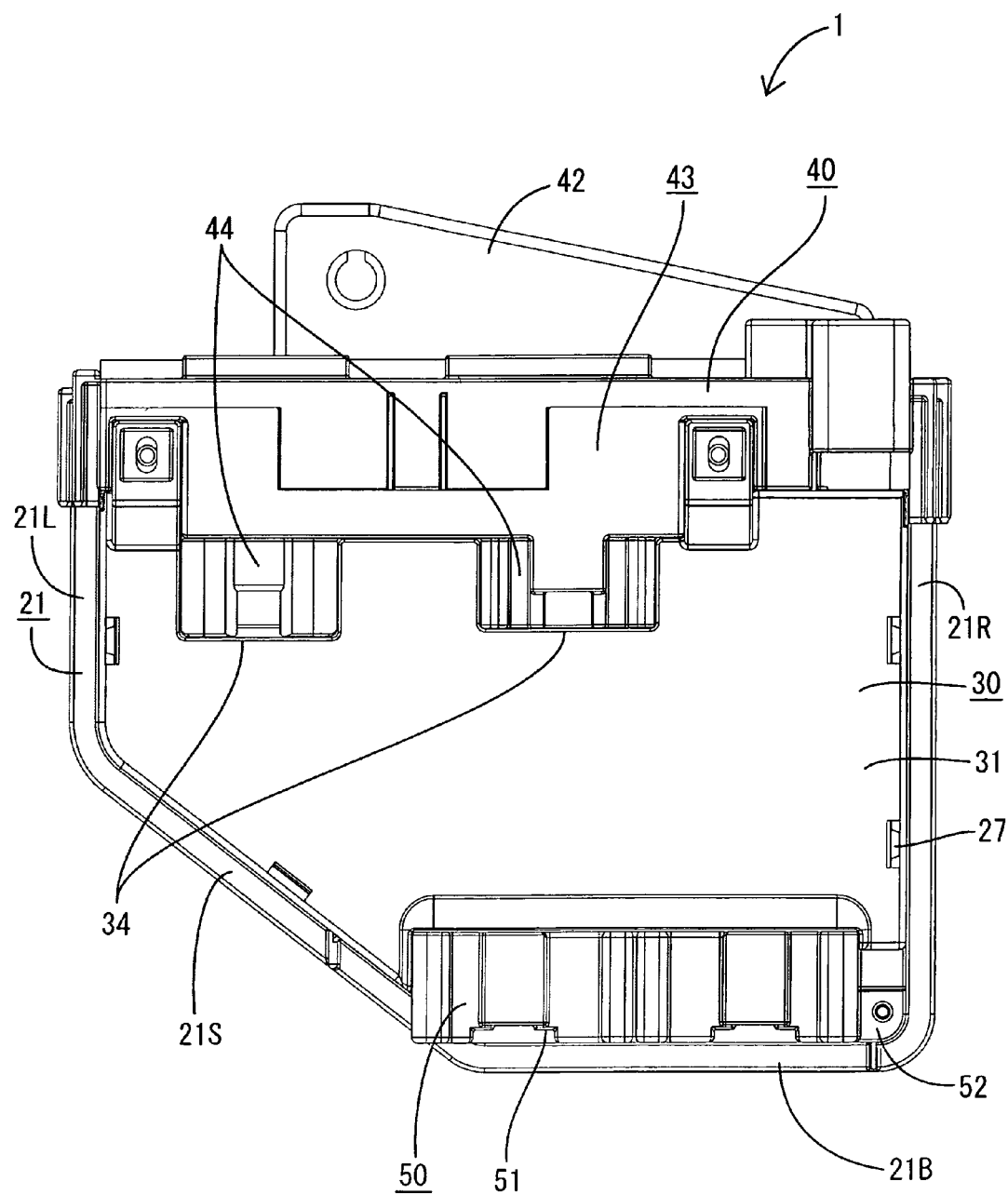
FIG. 2 is a top view of the electrical connection box according to the first embodiment.
Figure 3:
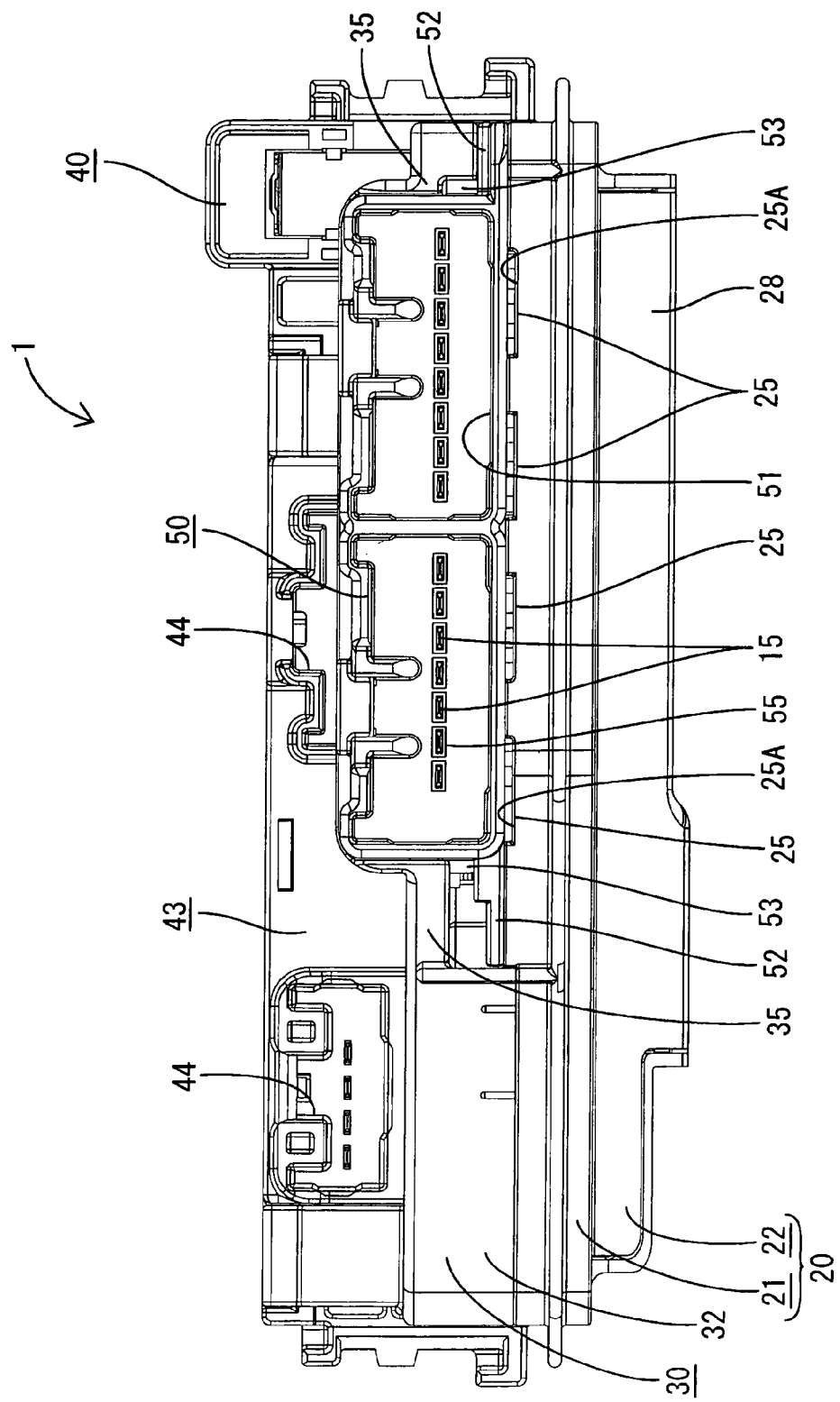
FIG. 3 is a bottom view of the electrical connection box according to the first embodiment.
Figure 4:
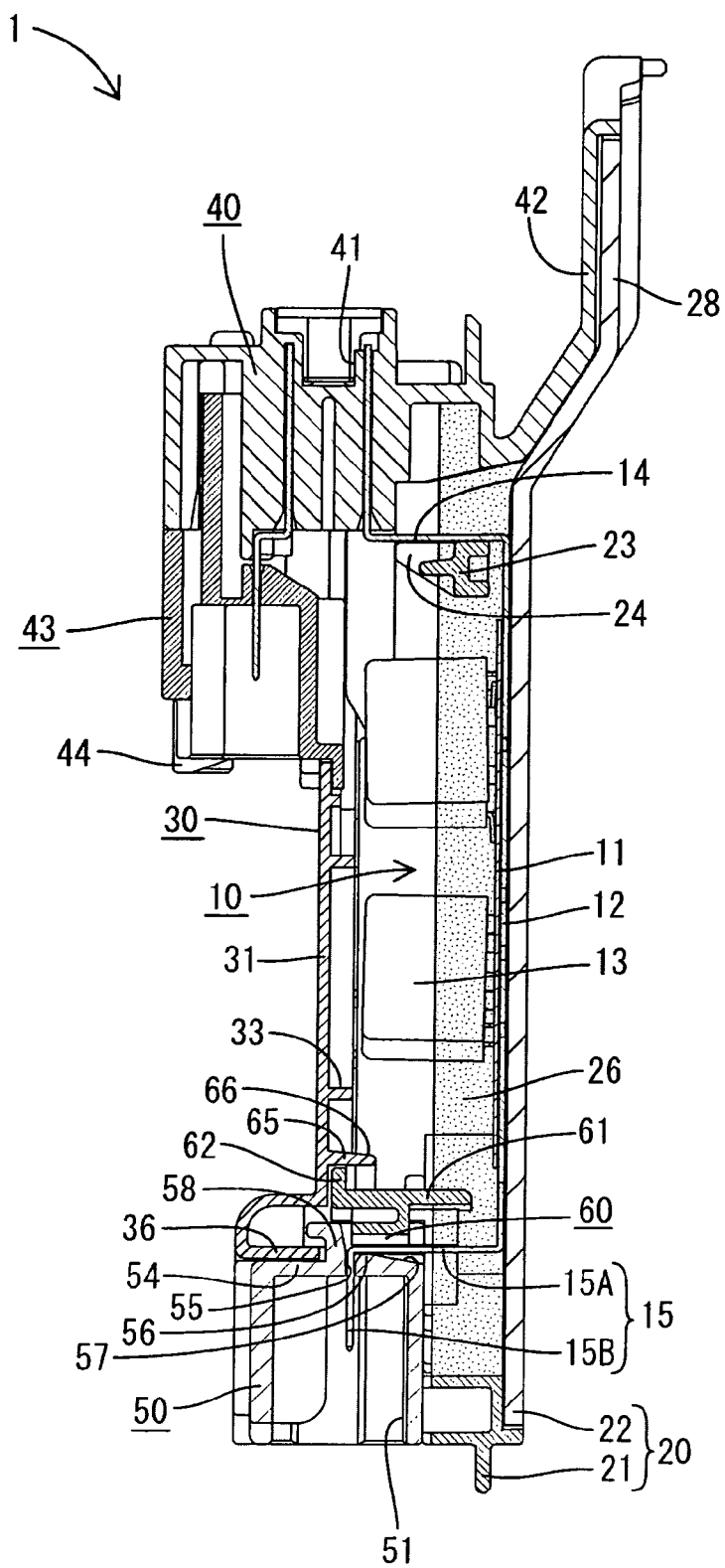
FIG. 4 is a side sectional view of the electrical connection box according to the first embodiment.
Figure 5:
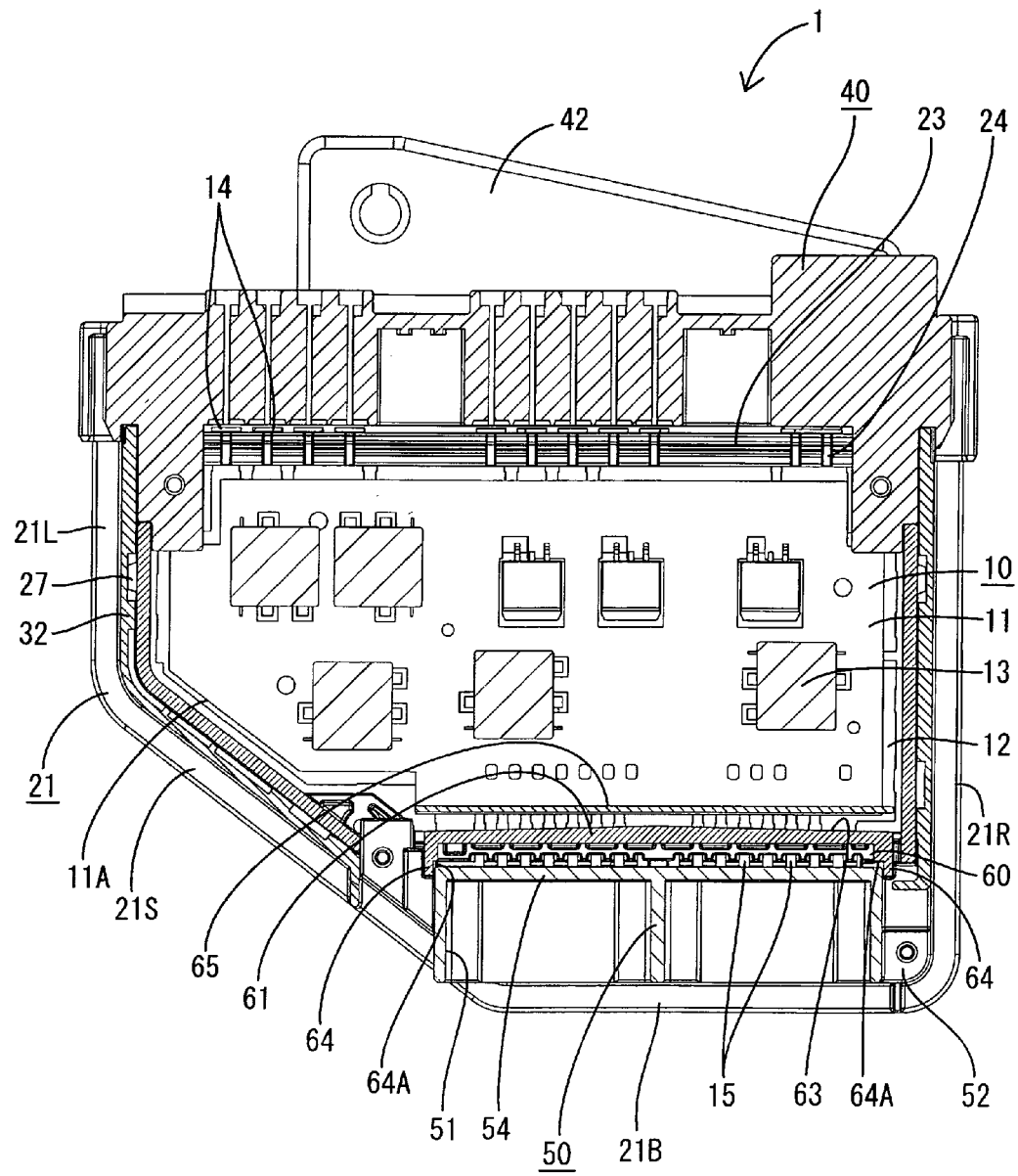
FIG. 5 is a horizontal sectional view of the electrical connection box according to the first embodiment.

FIG. 1 is an appearance perspective view of an electrical connection box 1 according to the first embodiment. FIG. 2 is a top view of the electrical connection box 1 according to the first embodiment. FIG. 3 is a bottom view of the electrical connection box 1 according to the first embodiment. FIG. 4 is a side sectional view of the electrical connection box 1 according to the first embodiment. FIG. 5 is a horizontal sectional view of the electrical connection box 1 according to the first embodiment.

In the electrical connection box 1, a circuit structure 10 including a circuit board 11 and a bus bar 12 is housed vertically in a casing 20 comprising a frame body 21 and a radiator panel 22, and the front side thereof is covered with a cover 30. The casing 20 and the cover 30 correspond to a circuit casing of the present invention.

Hereinafter, explanation of each component will be made supposing that the left side (i.e., cover 30 side) of FIG. 1 is the front side, the right side (i.e., casing 20 side) is the back side, the right upper side is the upper side, and the left lower side is the lower side. Further suppose that the right side of FIG. 2 is right and the left side is left.

The circuit board 11 of the circuit structure 10 has a rectangular plate-like shape as a whole. On the area substantially corresponding to the left half thereof, the lower edge slopes at an angle to the upper edge so as to form an inclined edge portion 11A (See FIG. 5). On the front surface of the circuit board 11, a conductor pattern (not shown) for a control circuit is formed, and further switching members 13, such as a relay, are mounted.

A bus bar 12 is bonded to the back surface of the circuit board 11. The bus bar 12 is made of a metal plate with a superior electrical conductivity by stamping, and forms a predetermined conductive path for a power circuit. The bus bar 12 has a shape substantially corresponding to that of the circuit board 11. A plurality of upper on-bus-bar terminals 14 and lower on-bus-bar terminals 15 as external circuit connecting terminals (corresponding to connector terminals of the present invention) are formed on the respective upper and lower edges of the bus bar 12 so as to protrude therefrom. The lower on-bus-bar terminals 15 are arranged on a segment, which is on the right side of the inclined edge portion 11A and parallel to the upper edge, of the lower edge of the circuit board 11. Each includes a raised portion 15A (corresponding to a horizontal portion of the present invention), rising on the front side of and substantially at right angles to the circuit board 11, i.e., rising horizontally, and an extended portion 15B, extending downward from the distal end of the raised portion 15A and substantially parallel to the circuit board 11 (See FIG. 4). The lower on-bus-bar terminals 15 are arranged at as short intervals as possible due to space limitations and the like.

The casing 20 for accommodating the circuit structure 10 includes the frame body 21 and the radiator panel 22.

The frame body 21 is made of an insulating material such as a synthetic resin, and forms substantially a U-shape as a whole so as to extend along the lower, left and right edges out of the periphery of the circuit board 11. Specifically, the frame body 21 includes an inclined frame portion 21S along the inclined edge portion 11A of the lower edge of the circuit board 11, a lower frame portion 21B along a segment, which is on the right side of the inclined edge portion 11A, of the lower edge of the circuit board 11, and right and left frame portions 21R and 21L along the respective right and left edges of the circuit board 11.

An upper connecting portion 23 connected between the right and left frame portions 21R and 21L is provided on the frame body 21 as shown in FIG. 5. The upper connecting portion 23 is disposed at a position slightly lower than the upper ends of the right and left frame portions 21R and 21L so as to abut to the upper on-bus-bar terminals 14 from below. A plurality of plate-like reinforcing portions 24, which correspond to the respective upper on-bus-bar terminals 14 and are at approximately right angles to the longitudinal direction of the upper connecting portion 23, are formed on the upper connecting portion 23.

Four recesses equally spaced are formed along the lower side of the frame body 21 and specifically on an area including the entire lower frame portion 21B and a lower frame portion 21B side part of the inclined frame portion 21S, i.e., an area to which a lower connector housing 50 described below is attached (See FIG. 3). Each recess is a shallow groove formed by depressing the front surface of the frame body 21 toward the backside. The internal space of the recess forms a clearance from the outer circumference of the lower connector housing 50. The clearance connects between the internal and external spaces of the casing 20, so as to serve as a drain outlet 25.

Further, a potting material 26 such as a gel (corresponding to a waterproof sealing material of the present invention) is injected into the frame body 21 so as to cover the front surface of the circuit board 11 and the proximal ends of the lower on-bus-bar terminals 15, and thereby the waterproof property is ensured. The potting material 26 is injected so that the front surface of the potting material 26 is substantially flush with the inner surfaces 25A of the drain outlets 25. Locking protrusions 27 for latching the cover 30 described below are formed on the right and left outer side surfaces of the frame body 21.

Further, the radiator panel 22 is attached to the frame body 21. The radiator panel 22 is formed of a metal with a high thermal conductivity so as to be slightly larger than the circuit board 11 (See FIG. 4). The radiator panel 22 is attached to the backside of the frame body 21 so as to fill the opening thereof, and further bonded to the backside of the bus bar 12 with an insulating adhesive. Further, a mounting plate 28 is formed so as to extend unevenly from the upper edge of the radiator panel 22 toward the upper back side. The electrical connection box 1 is mounted to a panel of a vehicle via the mounting plate 28 so as to be vertical with the lower connector housing 50, described below, down.

The cover 30 made of a synthetic resin is attached to the front side of the casing 20 so as to cover the opening thereof. The cover 30 includes a cover plate portion 31 which is a flat plate substantially in the same shape as the circuit board 11 as a whole and covers the front surface of the circuit board 11, and sidewall portions 32 which are along the respective right and left edges of the cover plate portion 31 and raised toward the backside. Thus the cover 30 as a whole has the shape of a shallow dish having the open back (See FIG. 1). Ribs 33 having a grid pattern as a whole is formed on the back surface of the cover plate portion 31 for preventing a sink or a wrap during molding (See also FIG. 4). The cover 30 has openings on its upper and lower sides respectively, to which a fuse box 40 and the lower connector housing 50 described below are respectively mounted. Cutout portions 34 are formed on the edge of the upper opening of the cover 30 as shown in FIG. 2 for preventing the interference with tubular engaging portions 44 of an upper connector housing 43 (described below). Each sidewall portion 32 includes a short wall portion 35, which is opposed to the front surface of a mounting portion 52 of the lower connector housing 50 (described below) and has a raised height shorter than the rest as shown in FIG. 3. An engaging groove 36 of a predetermined depth is formed along the lower end of the cover 30 (See FIG. 4).

The fuse box 40, disposed along the upper edge of the circuit board 11, is made of a synthetic resin, and has a laterally long shape, which covers the entire length of the upper areas of the casing 20 and the cover 30, and is raised on its front side from the front surface of the cover 30 (See FIG. 1). Fuse holding portions 41 are formed on the upper end of the fuse box 40, and the upper on-bus-bar terminals 14 are inserted into the fuse box 40 from below (See FIG. 4). Further a lid cover portion 42 for covering the upper surface of the mounting plate 28 of the radiator panel 22 extends from the backside edge of the fuse box 40.

The upper connector housing 43 is attached to the front raised portion of the fuse box 40 from below, and has a laterally long shape extending along the longitudinal direction of the fuse box 40. The upper connector housing 43 includes the two, i.e., right and left, tubular engaging portions 44 having the open bottoms for engaging an external connector.

The lower connector housing 50 (corresponding to a housing portion of the present invention) is attached to the lower side of the cover 30, and has a laterally long housing 51 which is made of a synthetic resin and has an opening on its lower side for engaging an external connector from below (See FIGS. 3 and 4). The mounting portions 52 for fixing the lower connector housing 50 to the frame body 21 are provided on the respective right and left side surfaces of the lower connector housing 50. Each mounting portion 52 has a plate-like shape extending outwardly from the backside edge of the right or left side of the lower connector housing 50. A clearance is formed between the front surface of each mounting portion 52 and the backside end of the short wall portion 35 of the cover 30, which serves as a drain window 53 for draining water from inside to the outside of the casing 20, similarly to the drain outlets 25.

Through holes 55 corresponding to the respective lower on-bus-bar terminals 15 are formed so as to vertically penetrate a ceiling portion 54 of the housing 51. Each lower on-bus-bar terminal 15 is disposed in the housing 51, so that its raised portion 15A is along a horizontal surface, formed on the upper surface of the ceiling portion 54 and around the middle of the front-to-back length thereof, and its extended portion 15B penetrates through the through hole 55 as shown in FIG. 4. The horizontal surface of the upper surface of the ceiling portion 54, to which the raised portion 15A abuts, forms a terminal contact portion 56. A portion, from the back end of the terminal contact portion 56 to the backside of the lower connector housing 50, forms an inclined portion 57 gently descending toward the backside. Engaging strips 58 are formed on the front side of the terminal contact portions 56 on the upper surface of the ceiling portion 54, which are fitted into the engaging groove 36 on the lower end of the cover 30.

A displacement restriction portion 60 is provided above the raised portions 15A of the lower on-bus-bar terminals 15 disposed on the upper surface of the lower connector housing 50 (See FIGS. 4 and 5), which prevents the raised portions 15A from displacing upward when an external connecter is engaged to the housing 51. The displacement restriction portion 60 forms a plate-like shape on the frame body 21, which connects from around the lower end of the right frame portion 21R to around the middle of the inclined frame portion 21S. The displacement restriction portion 60 is substantially parallel to the lower frame portion 21B, and abuts to a portion, protruding from the surface of the potting material 26, of the raised portion 15A of each lower on-bus-bar terminal 15 from above (i.e., from the opposite side of the lower connector housing 50).

A waterproof wall 61 (corresponding to a waterproof portion of the present invention) integrated with the displacement restriction portion 60 is provided above the displacement restriction portion 60, which prevents short-circuiting among the lower on-bus-bar terminals 15. The waterproof wall 61 forms a plate-like shape on the upper surface of the displacement restriction portion 60, which projects its cover 30 side and circuit structure 10 side edges toward the front and back sides respectively as shown in FIG. 4. The cover 30 side edge of the waterproof wall 61 (i.e., the edge on the opposite side of the circuit structure 10 side edge) extends forward across the front edge (i.e., the edge on the opposite side of the circuit structure 10) of the raised portion 15A of each lower on-bus-bar terminal 15 so as to reach close to the back surface of the cover plate portion 31. On the other hand, the circuit structure 10 side edge thereof is buried into the potting material 26 so as to reach around the middle of the front-to-back depth of the potting material 26. On the cover 30 side edge, an upwardly projecting water stop wall 62 (corresponding to a water stop portion of the present invention) is provided. The water stop wall 62 extends and almost abuts to the lower surface of a guide piece 65 described below. The water stop wall 62 is formed along the entire right-to-left width of the waterproof wall 61.

The right-to-left width (along the array of lower on-bus-bar terminals 15) of the waterproof wall 61 is slightly wider than the right-to-left width of the lower connector housing 50. That is, the waterproof wall 61 is formed over an area of a slightly wider width (along the array of the lower on-bus-bar terminals 15) than that of the area over which the lower on-bus-bar terminals 15 are arranged. The upper surface of the waterproof wall 61 forms a tapered surface 63 that peaks around the middle of the right-to-left width thereof and descends toward both the right and left sides. Further, waterproof sidewall portions 64 extending downward from the respective right and left ends of the waterproof wall 61 are provided. The waterproof sidewall portions 64 cover the sides of the respective outermost lower on-bus-bar terminals 15 (out of the array of the lower on-bus-bar terminals 15 disposed on the upper surface of the lower connector housing 50), and the lower end portions thereof extend to the ceiling portion 54 of the lower connector housing 50. The distal end portion of each of the right and left waterproof sidewall portions 64 is partially removed on its internal side, so that the interference with the corner of the ceiling portion 54 of the lower connector housing 50 is prevented and further as light gap is formed above the corner. Thus the cutout portions 64A, in which the respective corners are fitted, are formed.

A guide piece 65 is provided on the back surface of the cover 30 (i.e., the inner circumference of the cover 30) and above the water stop wall 62. The guide piece 65 protrudes backward, i.e., inwardly from the back surface of the cover plate portion 31 and across the water stop wall 62, so that its protruding end reaches the upper back side of the water stop wall 52. The upper surface of the guide piece 65 forms a guide surface 66 descending toward its protruding end. The entire width of the guide piece 65 is slightly wider than that of the waterproof wall 61. The right end thereof is substantially aligned with that of the waterproof wall 61, while the left end thereof slightly shifts to the left from that of the waterproof wall 61.

Next, the operation and the effects of the present embodiment constructed as above will be explained.

When water enters the electrical connection box 1 due to rain, vehicle wash or the like, the water flows down along the back surface of the cover 30, the surface of the potting material 26 and the like. The water along the back surface of the cover 30 reaches the guide piece 65 disposed above the lower on-bus-bar terminals 15, and is guided to the protruding end along the slope of the guide surface 66. Then the water drops down from the protruding end onto the waterproof wall 61. On the other hand, the water along the surface of the potting material 26 reaches the waterproof wall 61 buried into the potting material 26 above the lower on-bus-bar terminals 15. Then the water is accumulated on and blocked by the waterproof wall 61 which covers the ceiling portion 54 of the lower connector housing 50 from the above, so as not to reach the ceiling portion 54 of the lower connector housing 50. Thus the water is prevented from accumulating on the ceiling portion 54, and consequently short-circuiting among the lower on-bus-bar terminals 15 disposed thereon is prevented. In the present embodiment, the lower on-bus-bar terminals 15 are arranged at short intervals due to space limitations or the like, and therefore short-circuiting may occur even if a small amount of water reaches the lower on-bus-bar terminals 15. Therefore the waterproof wall 61 is particularly effective in this case.

Further the waterproof wall 61 is integrated with the displacement restriction portion 60, and thereby deformation of and short-circuiting among the lower on-bus-bar terminals 15 are both prevented without increasing the number of members.

The water on the waterproof wall 61 is guided to the right or left side along the tapered surface 63 formed on the upper surface of the waterproof wall 61, and then flows along the waterproof sidewall portions 64 so as to reach the outer wall surface of the lower connector housing 50. Since the right-to-left width of the waterproof wall 61 is slightly wider than the right-to-left width (along the array of the lower on-bus-bar terminals 15) of the area that includes the lower on-bus-bar terminals 15, the water dropping from either side thereof can be guided to an area in which the lower on-bus-bar terminals 15 are not disposed. The waterproof sidewall portions 64 cover the sides of the respective outermost lower on-bus-bar terminals 15, and extends so that the extending end thereof abuts to the outer wall of the lower connector housing 50. Thus the waterproof wall 61, the waterproof sidewall portions 64 and the ceiling portion 54 of the lower connector housing 50 surround the lower on-bus-bar terminals 15. Thereby the water flowing down from the right or left side of the waterproof wall 61 is prevented from flying to the internal side and reaching the lower on-bus-bar terminals 15.

The upwardly projecting water stop wall 62 is provided on the cover 30 side edge of the waterproof wall 61. Thereby the water guided to the waterproof wall 61 by the guide piece 65 is prevented from dropping from the front-side (i.e., the guide piece 65 side) edge of the waterproof wall 61, i.e., returning to the back surface of the cover plate portion 31 or the like, and reaching the lower on-bus-bar terminals 15. Furthermore the backside (i.e., circuit structure 10 side) edge of the waterproof wall 61 is buried into the potting material 26. Therefore there is no clearance between the waterproof wall 61 and the surface of the potting material 26 for enabling passage of water, and thereby the water is certainly kept away from the proximal side (i.e., the circuit structure 10 connecting side) of the lower on-bus-bar terminals 15. Further the waterproof wall 61 extends so that its front edge is on the upper front side of the extended portion 15B connecting side edges (i.e., the edges on the opposite side of the circuit structure 10) of the raised portions 15A. Thus the bared part of each raised portion 15A, which protrudes from the potting material 26, is entirely covered with the waterproof wall 61. Thereby the water is prevented from reaching the raised portions 15A, that is, further certainly kept away from the lower on-bus-bar terminals 15. Since the waterproof wall 61 also covers, from above, the through holes 55 through which the extended portions 15B penetrate, the water is prevented from reaching the through holes 55 and intruding into the housing 51.

The water on the outer wall surface of the lower connector housing 50 flows down along the outer wall surface, and drains to the outside via the drain outlets 25 or the drain windows 53.

According to the present embodiment, as described above, the waterproof wall 61 is integrally formed on the displacement restriction portion 60 provided for preventing displacement of the lower on-bus-bar terminals 15, so as to cover the upper surface of the lower connector housing 50 from above. Thereby water is prevented from accumulating on the upper surface of the lower connector housing 50, and consequently short-circuiting among the lower on-bus-bar terminals 15 is prevented. Further prevention of both of deformation of and short-circuiting among the lower on-bus-bar terminals 15 is achieved using a single member.

The waterproof wall 61 is formed so as to cover over the entire width of the array of the lower on-bus-bar terminals 15, and thereby water running over the outer edge of the waterproof wall 61 is guided outside of the area that includes the lower on-bus-bar terminals 15. Further, the waterproof sidewall portions 64 are formed on the respective right and left sides of the waterproof wall 61 so as to cover the sides of the outermost lower on-bus-bar terminals 15 (out of the plurality of lower on-bus-bar terminals 15) and extend to the outer surface of the lower connector housing 50. Thus the waterproof wall 61, the waterproof sidewall portions 64 and the lower connector housing 50 surround the lower on-bus-bar terminals 15. Therefore the water running over either side edge of the waterproof wall 61 is guided away without reaching the lower on-bus-bar terminals 15.

The upper surface of the waterproof wall 61 forms the tapered surface 63 descending from the middle of the right-to-left width thereof toward the right and left sides. Thereby the water on the waterproof wall 61 is guided along the slopes of the tapered surface 63 to the outside of the area that includes the lower on-bus-bar terminals 15, and thereafter drains. Thus the water accumulated on the waterproof wall 61 is drained while short-circuiting among the lower-on-bus-bar terminals 15 is prevented.

The circuit structure 10 side edge of the waterproof wall 61 is buried into the potting material 26, and therefore there is no clearance between the waterproof wall 61 and the surface of the potting material 26 (for enabling passage of water). Therefore the water is certainly kept away from the proximal side (i.e., circuit structure 10 connecting side) of the lower on-bus-bar terminals 15.

The backwardly protruding guide piece 65 is provided on the back surface of the cover 30 and above the waterproof wall 61. Further the water stop wall 62 is provided on the guide piece 65 side edge of the waterproof wall 61 so as to protrude toward the guide piece 65. Therefore the water flowing along the back surface of the cover 30 is certainly guided to the waterproof wall 61 via the guide piece 65, and thereafter prevented from dropping down from the guide piece 65 side edge of the waterproof wall 61 (i.e., returning to the back surface of the cover 30), and reaching the lower on-bus-bar terminals 15.

Second Embodiment

Hereinafter, a second embodiment of the present invention will be explained with reference to FIGS. 6 and 7.

Figure 6:
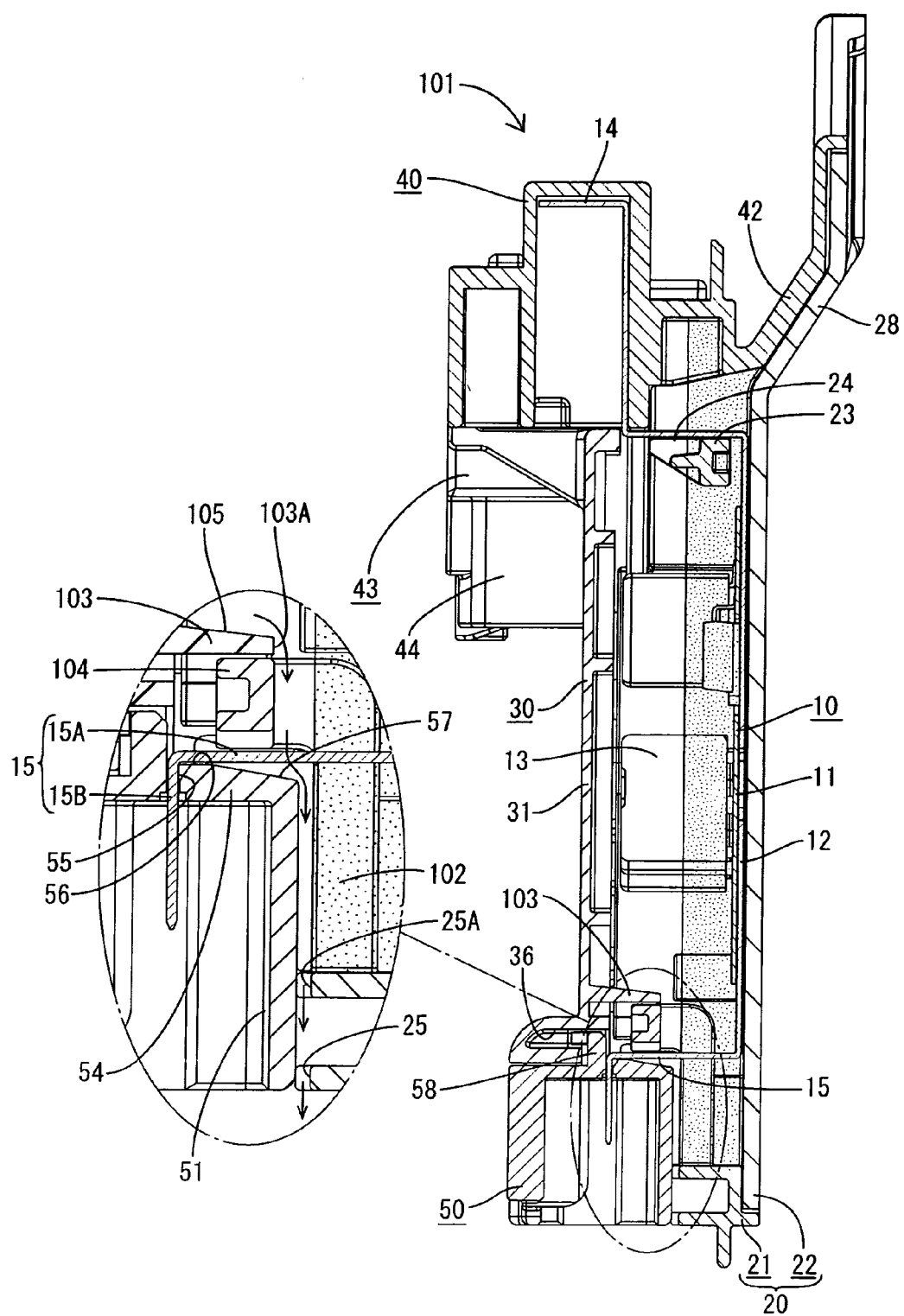
FIG. 6 is a side sectional view of an electrical connection box according to a second embodiment.
Figure 7:
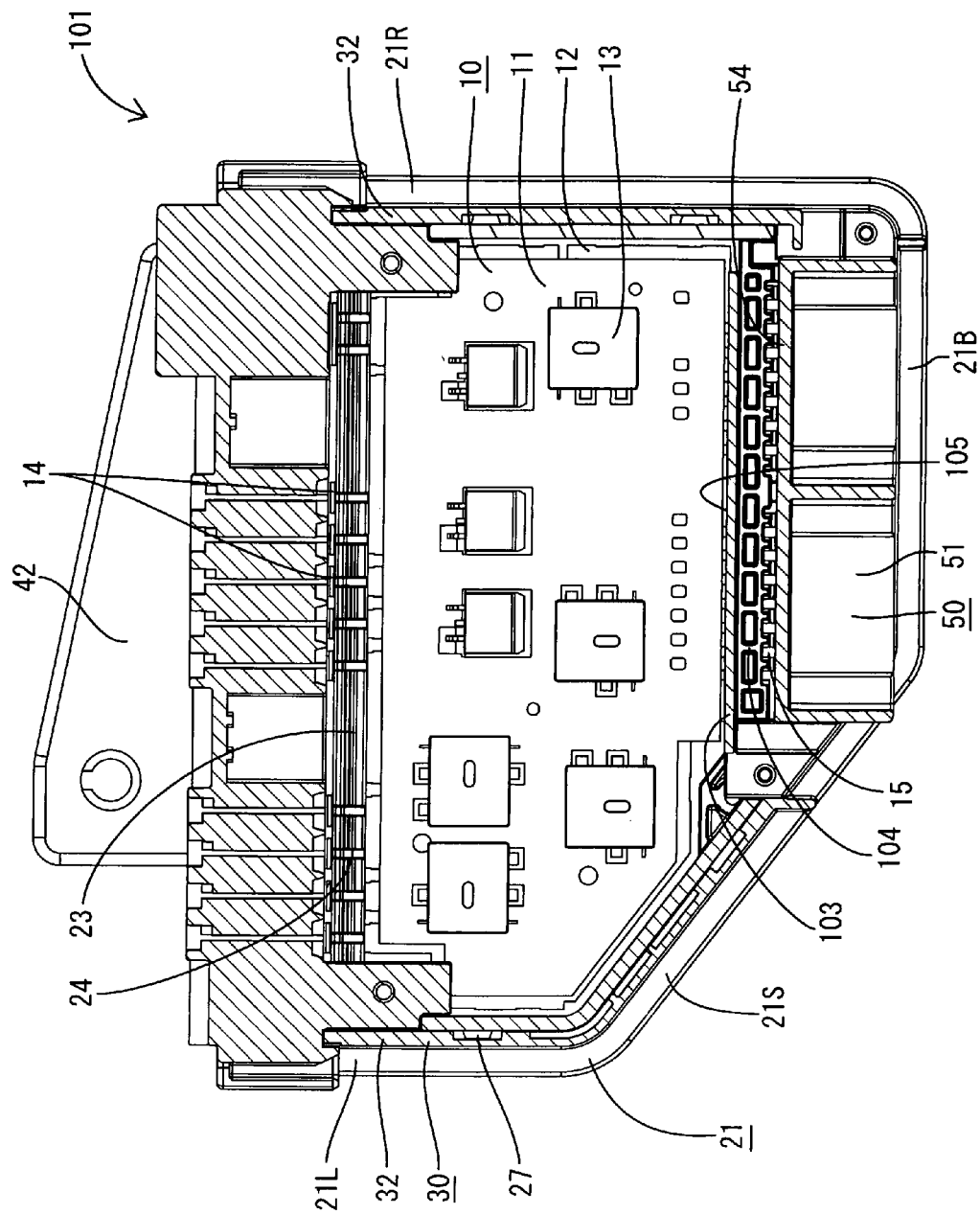
FIG. 7 is a horizontal sectional view of the electrical connection box according to the second embodiment.

FIGS. 6 and 7 show the side and horizontal sectional views of an electrical connection box 101 according to the second embodiment, respectively.

In the electrical connection box 101 according to the present embodiment, similarly to the first embodiment, a circuit structure 10 including a circuit board 11 and a bus bar 12 is housed vertically in a casing 20 comprising a frame body 21 and a radiator panel 22, and the front side thereof is covered with a cover 30. A potting material 102 such as a gel is injected into the frame body 21 so that its surface is substantially flush with the inner surfaces 25A of drain outlets 25 similarly to the first embodiment.

The difference from the first embodiment is that a waterproof wall 103 is not provided on the frame body 21 side but on the cover 30 side in the electrical connection box 101, and that the circuit structure 10 side edge of the waterproof wall 103 is not buried into the potting material 102.

The same components as the first embodiment are designated by the same symbols, and redundant explanation is omitted.

The waterproof wall 103 is formed on the back surface of the cover plate portion 31 of the cover 30, so as to be opposed to the upper surface of a displacement restriction portion 104 of the frame body 21. The waterproof wall 103 protrudes from the back surface of the cover plate portion 31 toward the potting material 102, so as to cover the terminal contact portions 56 of the lower connector housing 50 from above. The leading edge portion 103A (corresponding to an end edge portion of the present invention) thereof reaches above the inclined portions 57 formed on the backside of the terminal contact portions 56. A clearance for enabling passage of water is formed between the leading edge portion 103A and the surface of the potting material 102. The upper surface of the waterproof wall 103 forms a water guide surface 105 (corresponding to an inclined surface of the present invention) descending toward the leading edge portion 103A. The right-to-left width (along the array of the lower on-bus-bar terminals 15) of the waterproof wall 103 is slightly wider than the entire right-to-left width of the area that includes the lower on-bus-bar terminals 15 (See FIG. 7).

Next, the operation and the effects of the present embodiment constructed as above will be explained.

When water enters the electrical connection box 101 due to rain, vehicle wash or the like, the water flows down along the back surface of the cover 30, the surface of the potting material 102 and the like. Since the surface of the potting material 102 leads to the drain outlets 25, the water on the surface of the potting material 102 is guided directly to the drain outlets 25 and drains to the outside.

On the other hand, the water on the back surface of the cover 30 reaches the waterproof wall 103. The waterproof wall 103 covers the terminal contact portions 56 from above, and thereby the water is prevented from reaching the terminal contact portions 56 and accumulating thereon. Therefore short-circuiting among the lower on-bus-bar terminals 15 disposed on the upper surfaces of the terminal contact portions 56 due to water thereon is prevented even in the present embodiment in which the lower on-bus-bar terminals 15 are arranged at short intervals.

The water on the waterproof wall 103 is guided toward the potting material 102 by the water guide surface 105 formed on the upper surface of the waterproof wall 103, and then flows down from the leading edge portion 103A of the waterproof wall 103 and along the back surface of the displacement restriction portion 104 or the surface of the potting material 102 as shown by arrows in FIG. 6. The water on the surface of the potting material 102 flows down along the very same surface, and then drains via the drain outlets 25 to which the surface of the potting material 102 connects. Thus the water flows via the leading edge portion 103A and along the surface of the potting material 102 so as to drain via the drain outlets 25, and thereby the water is certainly prevented from accumulating on the terminal contact portions 56. The water on the back surface of the displacement restriction portion 104 reaches the inclined portions 57 formed on the upper surface of the lower connector housing 50. The water is then guided down to the clearance between the lower connector housing 50 and the surface of the potting material 102 by the inclined portion 57, so as to drain to the external via the drain outlets 25. Thus the water on the waterproof wall 103 is guided toward the potting material 102 side by the slope of the water guide surface 105 of the waterproof wall 103, and then to the drain outlets 25 for draining to the outside. Thereby short-circuiting among the lower on-bus-bar terminals 15 is certainly prevented.

The water may drop down from the right or left side of the water guide surface 105. However, the water drops along outer sides of the lower on-bus bar terminals 15 in this case, since the waterproof wall 103 is wider than the entire width of the area that includes the plurality of lower on-bus-bar terminals 15, that is, either side edge thereof is on the outer side of the outermost lower on-bus-bar terminal 15. Therefore short-circuiting among the lower on-bus-bar terminals 15 is prevented.

According to the present embodiment, as described above, the waterproof wall 103 protrudes from the back surface of the cover 30 so as to cover the terminal contact portions 56 of the lower connector housing 50 from above. Thereby water is prevented from accumulating on the terminal contact portions 56, and consequently short-circuiting among the lower on-bus-bar terminals 15 is prevented. Further, the right-to-left width of the waterproof wall 103 is wider than the entire width of the array in which the plurality of lower on-bus-bar terminals 15 is arranged on the terminal contact portions 56 in the right-to-left direction. Therefore the water dropping down from the outer edge of the waterproof wall 103 is guided to the either side of the area that includes the lower on-bus-bar terminals 15.

The upper surface of the waterproof wall 103 forms the water guide surface 105 descending toward the leading edge portion 103A side of the waterproof wall 103, i.e., toward the potting material 102 side, and the clearance for enabling passage of water is provided between the leading edge portion 103A of the waterproof wall 103 and the surface of the potting material 102. Therefore the water is guided to the surface of the potting material 102 by the slope of the water guide surface 105, so as to drain via the drain outlets 25. Thus the water is prevented from accumulating on the terminal contact portions 56, and consequently short-circuiting among the lower on-bus-bar terminals 15 is certainly prevented.

Other Embodiments

The technical scope of the present invention is not limited to the above embodiments, but the following embodiments may be included in the technical scope of the present invention, for example. Further the technical scope of the present invention may be expanded under the doctrine of equivalents.

(1) In the above embodiments, the circuit structure 10 is disposed vertically, but the present invention is not limited to this. The circuit structure may be disposed horizontally.

(2) In the above embodiments, each lower on-bus-bar terminal 15 extends toward the outside through the through hole 55 formed through the ceiling portion 54 of the housing 51, but the present invention is not limited to this construction. Each lower on-bus-bar terminal 15 may be supported by a supporting member provided for supporting the lower on-bus-bar terminal 15, and extend to the external through a hole formed through the bottom surface of the casing.

(3) In the above embodiments, each terminal contact portion 56 formed on the upper surface of the ceiling portion 54 of the housing 51 abuts to the raised portion 15A of the lower on-bus-bar terminal 15, but the present invention is not limited to this construction. The ceiling portion of the housing need not necessarily abut to the raised portions of the lower on-bus-bar terminals.

(4) In the above embodiments, the circuit structure 10 side edge of the waterproof wall 61 is buried into the potting material 26, or the clearance for enabling passage of water is provided between the leading edge portion 103A of the waterproof wall 103 and the surface of the potting material 102. However the present invention is not limited to these constructions. The edge of the waterproof wall may abut to the surface of the potting material.

(5) In the first embodiment, the right-to-left width of the waterproof wall 61 is wider than the right-to-left width of the lower connector housing 50, but not limited to this. That may be narrower than the right-to-left width of the lower connector housing 50.

(6) In the first embodiment, the waterproof sidewall portions 64 are extended from the respective right and left sides of the waterproof wall 61 so as to abut to the outer surface of the lower connector housing 50, but the present invention is not limited to this. The distal end portions of the waterproof sidewall portions 64 need not reach the lower connector housing. Further the waterproof sidewall portions need not be necessarily provided.

(7) In the second embodiment, the surface of the potting material 102 is substantially flush with the inner surfaces 25A of the drain outlets 25, but the present invention is not limited to this. The potting material need not be necessarily provided. Alternatively, a potting material may be provided so that its surface is unconnected with the drain outlets.

Figure 8:
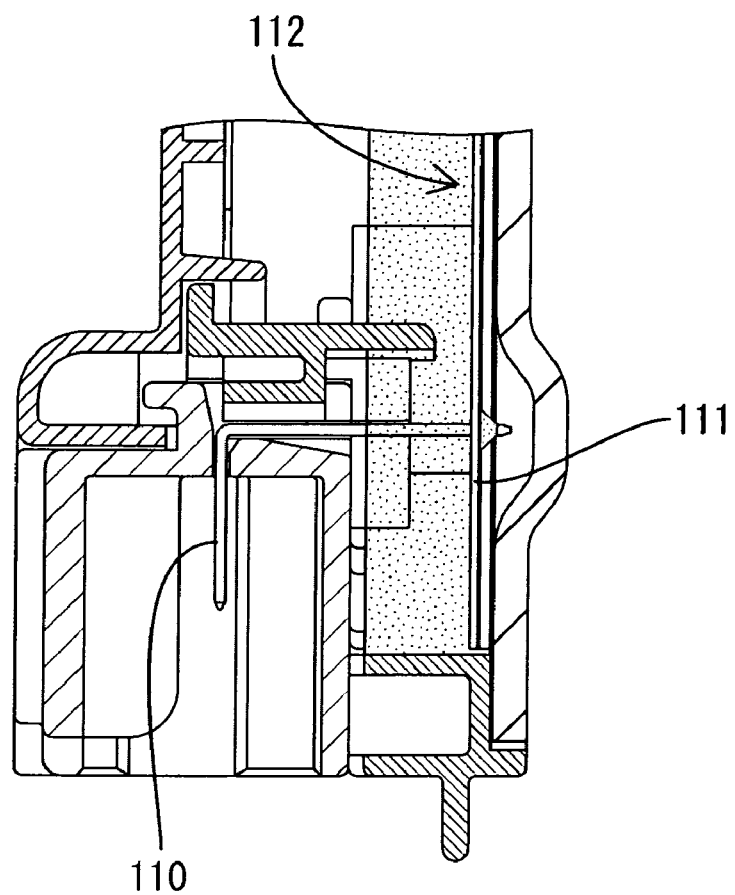
FIG. 8 is a partial side sectional view of an electrical connection box according to another embodiment.

(8) In the above embodiments, the terminals disposed on the circuit structure 10 and further in the lower connector housing 50 are integrated with the bus bar 12, that is, on-bus-bar terminals, but the terminals may be provided in any form. For example, those may be provided as connector terminals 110 shown in FIG. 8. Each connector terminal 110 is disposed so that one of its ends is inserted into a through hole formed through the circuit board 111, and soldered to the back surface of the circuit board 111 for electrically connecting to the circuit structure 112. Alternatively, one end of each connector terminal may be pressed into and held by a through hole as a press-fit terminal, for example, so that the electrical connection is achieved.

The invention claimed is:

1. An electrical connection box comprising a circuit casing for accommodating a circuit structure therein, a housing portion disposed on a lower surface side of said circuit casing and connectable to an external connector, and a plurality of connector terminals for electrically connecting between said circuit structure and said housing portion, wherein each of said plurality of connector terminals is disposed along a cabling path horizontally traversing an inside of said circuit casing and leads into said housing portion through a ceiling portion of said housing portion, said electrical connection box further including a waterproof portion provided in said circuit casing for covering said ceiling portion from above.

2. An electrical connection box as in claim 1, wherein a surface of said circuit structure is covered with a waterproof sealing material, and an end edge of a said circuit structure side of said waterproof portion is positioned into said waterproof sealing material.

3. An electrical connection box as in claim 2, wherein said waterproof portion includes a waterproof sidewall portion for covering a side of an outermost connector terminal of said plurality of connector terminals.

4. An electrical connection box as in claim 3, wherein said waterproof sidewall portion extends to an outer wall portion of said housing portion.

5. An electrical connection box as in claim 4, wherein an upper surface of said waterproof portion forms a tapered surface that descends from a middle of said plurality of connector terminals toward either side thereof.

6. An electrical connection box as in claim 5, further comprising a displacement restriction portion abutting from an opposite side of said housing portion to a horizontal portion of said plurality of connector terminals that horizontally traverses in said circuit casing, the displacement restriction portion positioned in said circuit casing to restrict displacement of said horizontal portion; and said waterproof portion is provided on said displacement restriction portion.

7. An electrical connection box as in claim 6, wherein said circuit casing is vertically positioned in said circuit structure, and a drain outlet for connecting between an internal space of said circuit casing and an external space provided on an lower portion of said circuit casing.

8. An electrical connection box as in claim 2, wherein a guide piece on an inner surface of said circuit casing is provided above said waterproof portion, said guide piece inwardly protruding so that a protruding end thereof extends above said waterproof portion.

9. An electrical connection box as in claim 8, wherein said waterproof portion includes a waterproof sidewall portion for covering a side of an outermost connector terminal of said plurality of connector terminals.

10. An electrical connection box as in claim 9, wherein said waterproof sidewall portion extends to an outer wall portion of said housing portion.

11. An electrical connection box as in claim 10, wherein an upper surface of said waterproof portion extends from a middle of said plurality of connector terminals toward either side thereof, further wherein the upper surface is tapered.

12. An electrical connection box as in claim 11, further comprising a displacement restriction portion abutting from an opposite side of said housing portion to a horizontal portion of said plurality of connector terminals that horizontally traverses in said circuit casing, the displacement restriction portion positioned in said circuit casing to restrict displacement of said horizontal portion; and said waterproof portion is provided on said displacement restriction portion.

13. An electrical connection box as in claim 12, wherein said circuit casing is vertically positioned in said circuit structure, and a drain outlet for connecting between an internal space of said circuit casing and an external space provided on an lower portion of said circuit casing.

14. An electrical connection box as in claim 8, wherein a water stop portion is provided on an edge portion of said waterproof portion on a said guide piece side, said water stop portion protruding toward said guide piece side and positioned below said protruding end of said guide piece.

15. An electrical connection box as in claim 14, wherein said waterproof portion includes a waterproof sidewall portion for covering a side of an outermost connector terminal of said plurality of connector terminals.

16. An electrical connection box as in claim 15, wherein said waterproof sidewall portion extends to an outer wall portion of said housing portion.

17. An electrical connection box as in claim 16, wherein an upper surface of said waterproof portion is tapered toward either side of said plurality of connector terminals.

18. An electrical connection box as in claim 17, further comprising a displacement restriction portion, abutting from an opposite side of said housing portion to a horizontal portion of said plurality of connector terminals that horizontally traverses in said circuit casing, the displacement restriction portion positioned in said circuit casing to restrict displacement of said horizontal portion; and said waterproof portion is provided on said displacement restriction portion.

19. An electrical connection box as in claim 18, wherein said circuit casing is vertically positioned in said circuit structure, and a drain outlet for connecting between an internal space of said circuit casing and an external space provided on an lower portion of said circuit casing.

20. An electrical connection box as in claim 1, wherein:

said circuit casing accommodates said circuit structure vertically;

a surface of said circuit structure is covered with a waterproof sealing material;

a drain outlet connected to a surface of said waterproof sealing material is positioned on an lower portion of said circuit casing for connecting between an internal space of said circuit casing and an external space; and an end edge portion of said waterproof portion is close to the surface of said waterproof sealing material while holding a clearance therebetween for enabling passage of water.

21. An electrical connection box as in claim 20, wherein an upper surface of said waterproof portion forms an inclined surface descending toward a side of said waterproof sealing material.

22. An electrical connection box as in claim 21, wherein a guide piece on an inner surface of said circuit casing is positioned above said waterproof portion, said guide piece inwardly protruding so that a protruding end thereof extends above said waterproof portion.

23. An electrical connection box as in claim 22, wherein a water stop portion is provided on an edge portion of said waterproof portion on a said guide piece side, said water stop portion extending toward said guide piece side and positioned under said guide piece.

24. An electrical connection box as in claim 20, wherein a guide piece on an inner surface of said circuit casing is positioned above said waterproof portion, said guide piece inwardly protruding so that a protruding end thereof extends above said waterproof portion.

25. An electrical connection box as in claim 24, wherein a water stop portion is provided on an edge portion of said waterproof portion on a said guide piece side, said water stop portion extends toward said guide piece side and positioned under said guide piece.

* * * * *